United States Patent
Klein

(10) Patent No.: US 6,587,405 B1
(45) Date of Patent: Jul. 1, 2003

(54) LINEAR OPTICAL DISK CHANGER WITH SIDE SWITCHING CAPABILITIES

(75) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/199,768

(22) Filed: Nov. 25, 1998

(51) Int. Cl.$^7$ .............................................. G11B 17/28
(52) U.S. Cl. ........................... 369/30.59; 369/30.61; 369/30.85; 369/30.89
(58) Field of Search ........................... 369/195, 199, 369/200, 30.47, 30.49, 30.59, 30.55, 30.61, 30.74, 30.7, 30.85, 30.87, 30.89, 30.31; 360/92; 414/277, 807

(56) References Cited

U.S. PATENT DOCUMENTS

| | | | |
|---|---|---|---|
| 1,799,148 A | | 4/1931 | Bryant |
| 1,955,939 A | * | 4/1934 | Bishop ........................ 369/192 |
| 2,937,026 A | | 5/1960 | Acker |
| 3,100,644 A | | 8/1963 | Osborne et al. ............... 369/37 |
| 3,165,321 A | | 1/1965 | Osborne et al. |
| 4,416,003 A | * | 11/1983 | Suzuki ......................... 369/199 |
| 4,504,934 A | | 3/1985 | Tanaka et al. |
| 4,519,055 A | | 5/1985 | Gilson ........................... 369/37 |
| 4,580,254 A | * | 4/1986 | Hojyo et al. .............. 369/30.29 |
| 4,800,999 A | * | 1/1989 | Matsuo ........................ 198/370 |
| 4,807,208 A | | 2/1989 | Geiger ........................... 369/39 |
| 4,855,980 A | * | 8/1989 | Hug et al. ...................... 369/36 |
| 4,910,619 A | * | 3/1990 | Suzuki et al. ................... 360/92 |
| 4,972,778 A | * | 11/1990 | Suominen .................... 104/183 |
| 5,027,335 A | * | 6/1991 | Deis ......................... 369/30.77 |
| 5,067,116 A | | 11/1991 | Kadrmas ........................ 369/37 |
| 5,081,618 A | * | 1/1992 | Abe ............................ 369/195 |
| 5,099,465 A | | 3/1992 | Geiger et al. ................... 369/36 |
| 5,128,912 A | * | 7/1992 | Hug et al. ....................... 369/38 |
| 5,153,862 A | | 10/1992 | Taylor et al. .................. 369/36 |
| 5,157,648 A | * | 10/1992 | Okamoto et al. ............ 369/195 |
| 5,214,628 A | | 5/1993 | Langman et al. ............ 375/122 |
| 5,235,575 A | | 8/1993 | Han |
| 5,235,579 A | | 8/1993 | Ross ............................. 369/37 |
| 5,257,111 A | | 10/1993 | Kakuyama ................... 358/342 |
| 5,293,284 A | * | 3/1994 | Sato et al. ...................... 360/92 |
| 5,311,497 A | * | 5/1994 | Takizawa et al. ............ 369/195 |
| 5,448,373 A | | 9/1995 | Kim ............................ 358/342 |
| 5,502,697 A | * | 3/1996 | Taki ............................. 369/34 |
| 5,502,703 A | | 3/1996 | Yamada et al. |
| 5,506,830 A | * | 4/1996 | Ohishi et al. ................ 369/195 |
| 5,528,566 A | | 6/1996 | McGee et al. |
| 5,559,776 A | | 9/1996 | Ikenaga |
| 5,561,657 A | | 10/1996 | Ogawa ......................... 369/179 |
| 5,586,094 A | * | 12/1996 | Pines et al. ............... 369/30.85 |
| 5,610,882 A | * | 3/1997 | Dang ............................. 360/92 |
| 5,613,745 A | | 3/1997 | Cho et al. ..................... 312/9.9 |
| 5,615,184 A | | 3/1997 | Tsuruta et al. ................. 369/37 |
| 5,631,785 A | * | 5/1997 | Dang et al. ..................... 360/92 |
| 5,671,196 A | | 9/1997 | Yoshida et al. ................ 369/34 |
| 5,682,364 A | | 10/1997 | Ogawa ......................... 369/36 |
| 5,689,490 A | | 11/1997 | Pollard |
| 5,692,878 A | | 12/1997 | Freund ..................... 414/796.6 |
| 5,699,281 A | * | 12/1997 | Crucius et al. ............. 364/561 |
| 5,719,725 A | | 2/1998 | Nakao ...................... 360/98.06 |
| 5,742,570 A | * | 4/1998 | Taki et al. ...................... 369/36 |
| 5,754,502 A | | 5/1998 | Kamemura ................... 369/37 |
| 5,761,160 A | | 6/1998 | Sanada |
| 5,841,744 A | | 11/1998 | Menke et al. |
| 5,923,638 A | * | 7/1999 | Watanabe .................... 369/192 |
| 5,959,958 A | | 9/1999 | Inatani et al. |
| 5,982,719 A | * | 11/1999 | Nishijima et al. ............. 369/34 |
| 5,995,320 A | * | 11/1999 | Ostwald ........................ 360/92 |
| 6,064,544 A | * | 5/2000 | Wada ............................ 360/92 |
| 6,212,139 B1 | * | 4/2001 | Nakamura et al. ........ 369/30.85 |
| 6,504,798 B1 | * | 1/2003 | Revis ....................... 369/30.23 |

FOREIGN PATENT DOCUMENTS

| | | | |
|---|---|---|---|
| JP | 57-139403 | * | 2/1984 |
| JP | 59-030263 | | 2/1984 |
| JP | 1-237952 | | 9/1989 |
| JP | 4-22441 | * | 1/1992 |

OTHER PUBLICATIONS

U.S. patent application 09/200,320 to Klein, Dean filed on Nov. 25, 1998.*
"General DVD"; p.4 Oct. 1, 1998.

* cited by examiner

*Primary Examiner*—Brian E. Miller
(74) *Attorney, Agent, or Firm*—Perkins Coie LLP

(57) ABSTRACT

An optical disk changer that is capable of automatically playing both sides of a dual-sided optical disk. By coordinated rotation and delivery of disks taken from a linear disk storage bin, both sides of a dual-sided optical disk can be automatically accessed.

16 Claims, 12 Drawing Sheets

LINEAR OPTICAL DISK CHANGER WITH SIDE SWITCHING CAPABILITIES

RELATED APPLICATION

The subject matter of the U.S. Patent Application entitled "OPTICAL DISK CHANGER WITH SIDE SWITCHING CAPABILITIES," filed a concurrently herewith, application Ser. No. 09/200,320, contains related subject matter.

TECHNICAL FIELD

The present invention is directed toward an apparatus and method for automatically accessing both sides of an optical disk retrieved from a linear stack of optical disks.

BACKGROUND OF THE INVENTION

Data of various types is recorded on and accessed from optical disks. Common optical disks include compact disks (CDs), CD-ROMs, digital versatile disks (DVDs), digital video disks (also abbreviated DVDs), or other similar disks. Some optical disks, such as DVDs, may be either single-sided or dual-sided. With conventional optical disk changers, a dual-sided optical disk must be manually "flipped" between sides in order to read data from both sides of the disk.

Three general types of optical disk changers capable of storing and reading multiple disks are known. In the first type, a number of disks are positioned coplanar to one another and radially about a center rotation point on a carrousel. To read any one disk, the carrousel is rotated until the desired disk is positioned adjacent to the disk reader. To read another disk, the present disk is disengaged from the reader and the carrousel is rotated to position another disk adjacent to the disk reader. However, such optical disk changers read only one side of a disk. Thus, operator intervention is required to flip the disk to allow the disk reader to read the opposite side of the disk.

The second type of multiple disk changer stores optical disks radially about a center rotation point on a carrousel, but with the rotational axis of each optical disk perpendicular to the axis of rotation of the carrousel. The resulting geometry of the plurality of stored disks is a toroid or "donut" shape. A disk from the carrousel is read by ejecting the disk from the carrousel into a disk reader.

The third type of multiple disk changer stores optical disks in a stack with the center of each disk coaxial with the centers of the other disks. A disk to be read is rotated or translated out from the stack and engaged by a disk reader. Just as with the first type of multiple disk changer, the changer can read only one side of a disk unless the disk is manually flipped by a user. Examples of this third type of multiple disk changer are illustrated in U.S. Pat. Nos. 4,807,208, 5,099,465, 5,153,862, 5,561,657, 5,682,364, and 5,692,878. However, these changers are only capable of reading one side of the optical disk unless the user manually flips the disk.

Therefore, although the prior art is capable of storing a large number of optical disks, the prior art does not provide an apparatus or method for reading both sides of a optical disk without manual operator intervention. Consequently, there is a need for an apparatus and method for automatically reading both sides of an optical disk by effectively flipping a dual-sided disk.

SUMMARY OF THE INVENTION

One embodiment of the invention is an optical disk changer for reading a first and a second side of an optical disk. The disk changer includes: a base; a disk bin coupled to said base for holding the optical disk; a transfer mechanism slidably and rotatably coupled to said base for loading a disk from said disk bin and positioning the disk to be read; and an optical disk reader attached to said base for loading a disk from said transfer mechanism and reading the disk.

Another embodiment of the invention is an optical disk changer for reading a first and a second side of an optical disk comprising: a base; a disk bin coupled to said base for holding the optical disk; and an optical disk reader slidably and rotatably coupled to said base for loading a disk from said disk bin, reading the disk, and returning the disk to said disk bin.

Yet another embodiment of the invention is an optical disk changer for reading a first and a second side of an optical disk comprising: a base; a disk bin coupled to said base for holding the optical disk; a transfer mechanism slidably and rotatably coupled to said base for loading a disk from said disk bin and positioning the disk to be read; and an optical disk reader slidably coupled to said base for loading a disk from said transfer mechanism and reading the disk.

Still another embodiment of the invention is a method of reading data from an optical disk comprising: holding the optical disk in a bin; delivering the optical disk from the bin to a transfer mechanism by translating the optical disk in a first direction; delivering the optical disk from the transfer mechanism to an optical disk reader by translating the optical disk in a first direction; reading data from a first side of the optical disk; delivering the optical disk to the transfer mechanism by translating the optical disk in a second direction; rotating the transfer mechanism about a vertical axis; loading the optical disk from the transfer mechanism to the optical disk reader by translating the optical disk in the first direction; and reading data from a second side of the optical disk.

Another embodiment of the invention is a method of translating an optical disk having a first side and a second side comprising: holding the optical disk in a disk bin; if data from a first side of the optical disk is to be read, then translating the optical disk to a first location in a first direction; and if data from a second side of the optical disk is to be read, then translating the optical disk to a second location in the first direction, rotating the optical disk, and translating the optical disk to the first location in the first direction.

Still another embodiment of the invention is a method of reading data from an optical disk comprising: holding the optical disk in a disk bin; if data from a first side of the optical disk is to be read, delivering the optical disk through a first side of an optical disk reader, and reading the data; and if data from a second side of the optical disk is to be read, rotating the optical disk reader, delivering the optical disk through a second side of the optical disk reader, and reading the data.

Another embodiment of the invention is a method of reading data from an optical disk comprising: holding the optical disk in a bin; delivering the optical disk from the bin to a transfer mechanism by translating the optical disk in a first direction; delivering the optical disk from the transfer mechanism to an optical disk reader by translating the optical disk in a third direction substantially perpendicular to the first direction; reading data from a first side of the optical disk; delivering the optical disk to the transfer mechanism by translating the optical disk in a second direction substantially parallel with the first direction; rotating the transfer mechanism about a vertical axis; loading the optical disk from the transfer mechanism to the optical disk reader by translating the optical disk in the third direction; and reading data from a second side of the optical disk.

DETAILED DESCRIPTION OF THE INVENTION

Embodiments of the present invention are directed toward an optical disk changer that is capable of automatically playing both sides of a dual-sided optical disk. The optical disk played may be a CD, CD-ROM, DVD, or any other such optical disk. In one embodiment of the invention, a sliding and rotating transfer mechanism positions either side of a dual-sided disk to be read in a stationary optical disk reader that has its axis of loading substantially perpendicular to the direction of sliding of the transfer mechanism. Another embodiment of the invention employs a sliding and rotating optical disk reader to read both sides of a disk. Still another embodiment of the invention provides for a reader that slides as well as a transfer mechanism that both slides and rotates to read both sides of a disk. In yet another embodiment of the invention, a sliding and rotating transfer mechanism positions either side of a dual-sided disk to be read in a stationary optical disk reader that has its axis of loading substantially parallel with to the direction of sliding of the transfer mechanism.

Description of the First Embodiment

Figure 1:
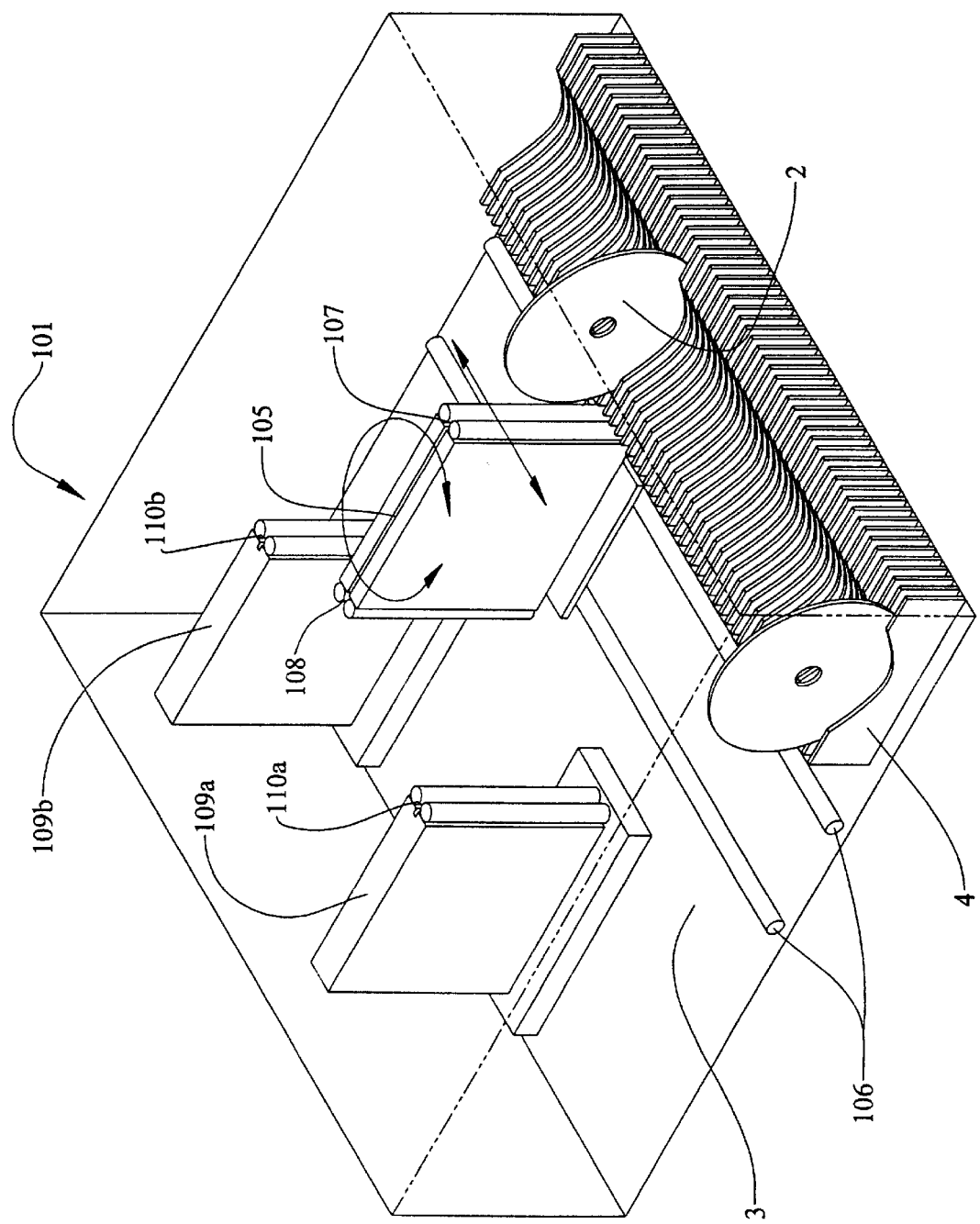
FIG. 1 is a top isometric view of an optical disk changer with a transfer mechanism slidably and rotatably coupled to a base and disk reader attached to the base.

FIG. 1 shows an optical disk changer 101 for reading a first and a second side of an optical disk 2. In an embodiment of the invention, the disk may be a dual-sided DVD. In FIG. 1, the top and two sides of the disk changer 101 have been removed for clarity. A base 3 supports a disk bin 4.

Disk Bin

As shown in FIG. 1, the disk bin 4 is coupled to the base 3. The disk bin 4 has slots for holding a plurality of optical disks. The disk bin 4 is designed to hold the plurality of optical disks coaxially relative to one another. That is, as held, the centers of the disks are aligned substantially linearly. The walls of the slots should be of sufficient stiffness so that they properly support the optical disks. In some embodiments, walls of the slots are of constant thickness. In other embodiments of the invention, the disk bin does not have slots. Instead, the disks are stacked against one another in a similar coaxial linear arrangement. In such an arrangement, end supports (not shown) are necessary at both ends of the plurality of disks.

The disk bin 4 may also include locating surfaces along the bottom of the slots (not shown). These locating surfaces properly position an optical disk that is received by a user or a disk reader. In addition, the locating surfaces keep an optical disk that is being held in a disk bin 4 from prematurely exiting the disk bin 4. Further, these locating surfaces provide a precise position for an optical disk that is to be delivered to a disk reader. Locating surfaces are known in the art.

The disk bin 4 may be constructed from a variety of materials. However, it may be optimal to mold the disk bin 4 from plastic.

Transfer Mechanism

In the embodiment illustrated in FIG. 1, a transfer mechanism 105 that is coupled to rails 106 of the base 3 is able to slide back and forth on the rails 106. Additionally, at least a portion of the transfer mechanism 105 is able to rotate about a vertical axis relative to the base 3.

In the embodiment shown in FIG. 1, the transfer mechanism 105 includes a first loading mechanism 107 that is located on a first side of the transfer mechanism 105. The first loading mechanism 107 may be formed by two substantially parallel cylinders that cooperatively rotate to move the optical disk. The transfer mechanism 105 also contains a second loading mechanism 108 on a second side of the transfer mechanism 105. The second loading mechanism 108 may also be formed by two substantially parallel cylinders that cooperatively rotate to move the optical disk. Loading mechanisms of various configurations are well known in the art and other operable loading mechanisms are within the scope of the claims of the present invention.

The transfer mechanism 105 may also include an ejector arm (not shown). The ejector arm can be used to push the optical disk 2 from the disk bin 4 in a first direction to the transfer mechanism 105. Any ejector mechanism that loads the disk 2 from the carrousel 4 into the transfer mechanism 105 with or without use of an ejector arm will suffice. Ejector arms for disk loading are well known in the art.

Optical Disk Readers

Referring again to FIG. 1, an optical disk reader 109a is shown. As shown in FIG. 1, the reader 109a is attached to the base 3. In an embodiment of the invention, the reader 109a may be located near the center of the disk bin 4 so that the average length of travel of the transfer mechanism 105 is minimized. The optical disk changer illustrated shows two optical disk readers, 109a and 109b. Two or more optical disk readers are within the claims and allow increased information access with a single disk changer. The operation of either disk reader is substantially the same and therefore the description below merely describes the operation of the optical disk reader 109a.

The optical disk reader 109a can load a disk from the transfer mechanism 105, play the disk, and return the disk to the transfer mechanism 105. The optical disk reader 109a includes conventional sensors and electronics for reading an optical disk. In addition, the reader 109a includes a first loading mechanism 110a that is located on a first side of the reader 109a. The first loading mechanism 110a may be formed by two substantially parallel cylinders that cooperatively rotate to move the optical disk. The optical disk reader 109b also has a first loading mechanism 110b.

Method of Operating the First Embodiment of the Invention

Figure 5:
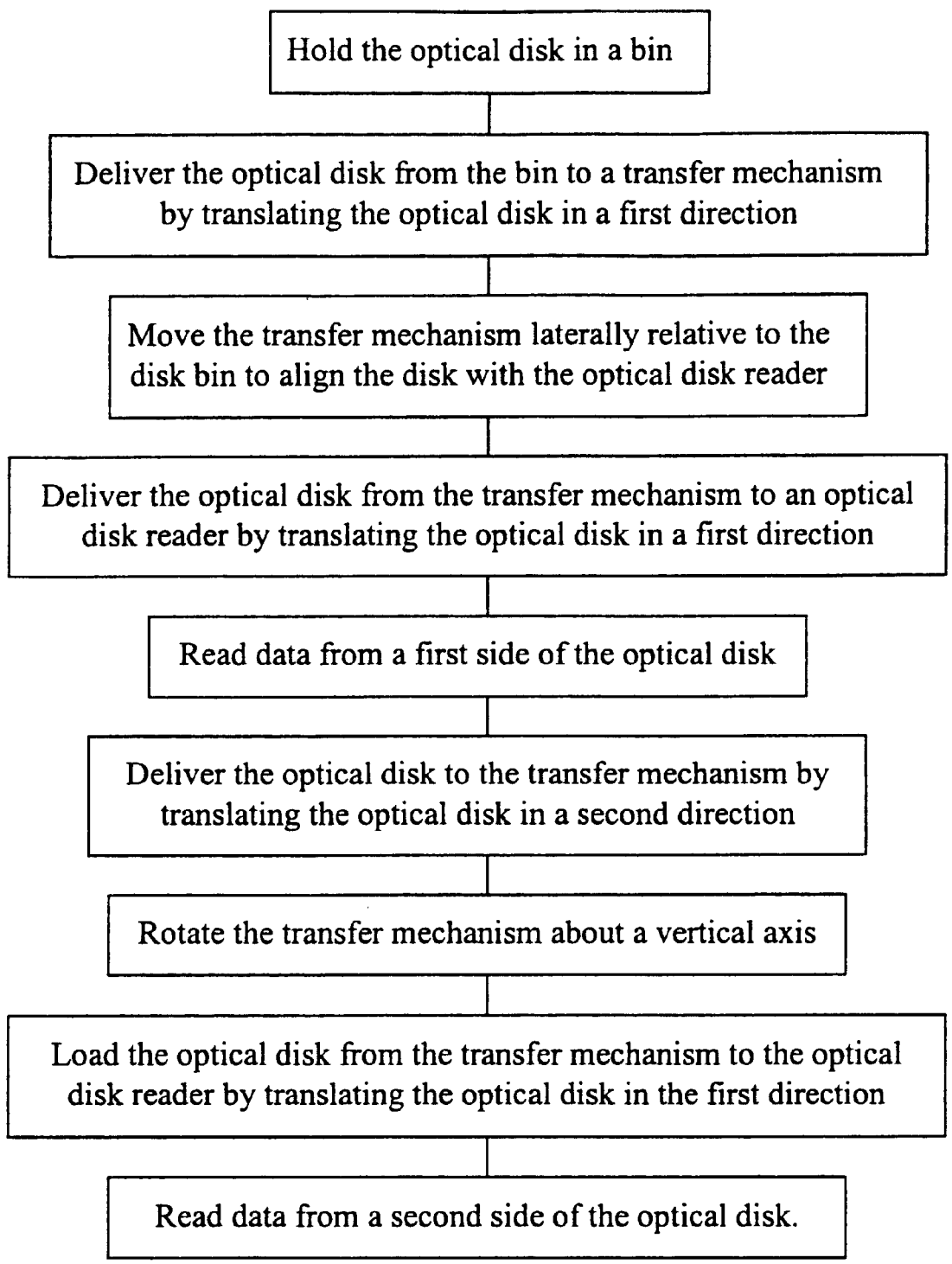
FIG. 5 is a flowchart illustrating a method of reading data from an optical disk associated with a first embodiment of the present invention.

One embodiment of the invention is a method of reading data from an optical disk. This method, which is shown in FIG. 5, may be performed by the disk changer 101 shown in FIG. 1. First, an optical disk that is being held in a disk bin is delivered from the disk bin into a transfer mechanism by translating the disk in a first direction. The disk is then delivered to an optical disk reader by first moving the entire transfer mechanism laterally relative to the disk bin to align the disk with the optical disk reader, and subsequently translating the disk in a first direction to the optical disk reader.

Next, data from a first side of the disk is read. After data from the first side of the disk is read or upon operator command, the disk is unloaded from the reader and delivered to the transfer mechanism by translating the disk in the second direction. In some embodiments, at least a portion of the transfer mechanism is rotated one hundred eighty degrees about a vertical axis to flip the disk in preparation for a second side of the disk to be read. Next, the disk is loaded from the transfer mechanism to the optical disk reader by translating the optical disk in the first direction.

Then, data from the second side of the optical disk may be read. After data from the second side of the disk is read or upon operator command, the disk is unloaded from the reader and delivered in the second direction to the transfer mechanism. From the transfer mechanism, the disk may be returned to the disk bin.

Another Method of Operating the First Embodiment of the Invention

Figure 6:
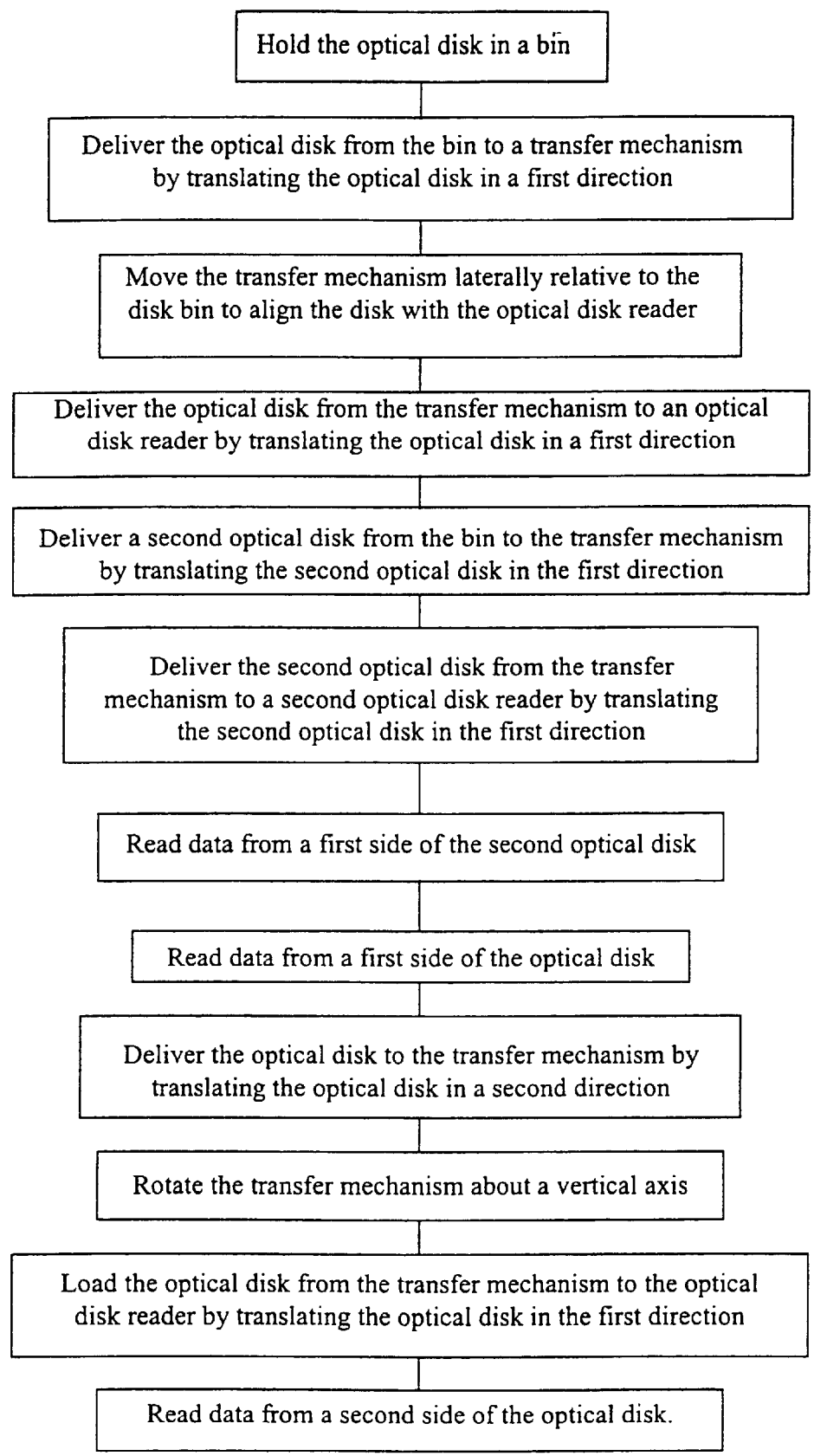
FIG. 6 is a flowchart illustrating a method of reading data from an optical disk associated with a first embodiment of the present invention.

In another method of operating the first embodiment, a second optical disk reader is required. The method, which is illustrated in FIG. 6, may be performed by the disk changer 101 shown in FIG. 1. The method provides for simultaneous or rapid sequential reading of multiple optical disks. After the act of delivering the first optical disk from the transfer mechanism described in the embodiment above, a second optical disk is delivered from the bin to the transfer mechanism by translating the second optical disk in the first direction. The second optical disk may then be delivered from the transfer mechanism to a second optical disk reader by translating the second optical disk in the first direction. Data from a first side of the second optical disk may then be read.

It is evident from a description of this method that two or more disks can be handled by the disk changer described to enable a large data retrieval capacity from a single changer. With such a machine and method, the number of readers required per disk made accessible can be reduced.

Yet Another Method of Operating the First Embodiment of the Invention

Figure 7:
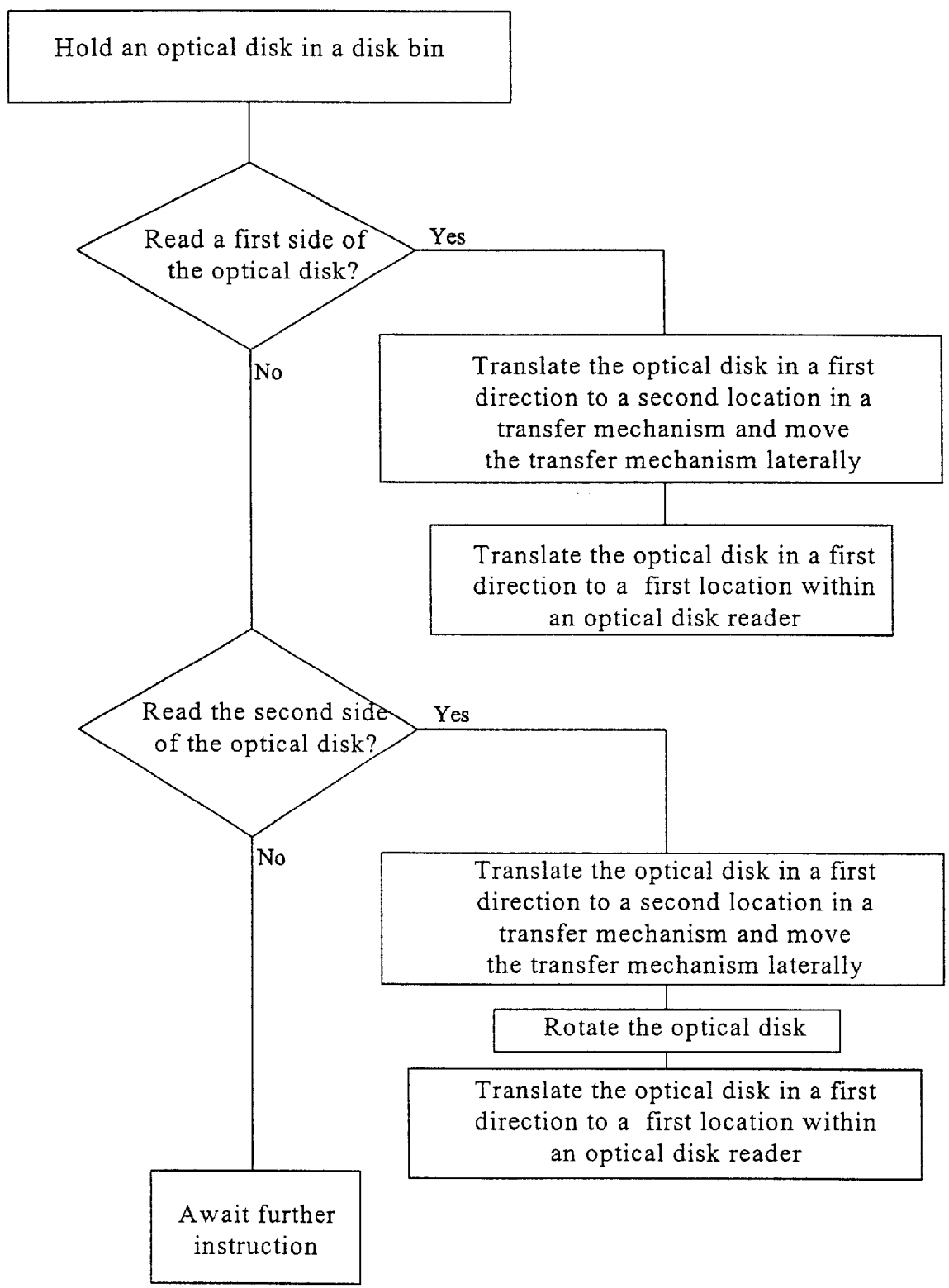
FIG. 7 is a flowchart illustrating a method of translating an optical disk associated with a first embodiment of the present invention.

Another embodiment of the invention is shown in FIG. 7. This method may be performed by the disk changer 101 shown in FIG. 1. In this embodiment, an optical disk is held in a disk bin. If data from the first side of the optical disk is to be read, the optical disk is translated in a first direction to a location within an optical disk reader where the disk can be read. In some embodiments, the disk is first translated to a transfer mechanism that may be moved laterally and then to the location within the optical disk reader. After reading the data on the first side of the disk, the disk may be returned to the disk bin.

On the other hand, if data from the second side of the optical disk is to be read, then the optical disk is translated in a first direction to a second location in the transfer mechanism and rotated by the transfer mechanism. Subsequently, the optical disk is delivered to the disk reader by translating the optical disk to the optical disk reader in a first direction. In some embodiments, the transfer mechanism also moves the disk laterally by moving laterally relative to the disk bin. After reading the data on the second side of the disk, the disk may be delivered back to the transfer mechanism and to the disk bin.

Description of the Second Embodiment

Figure 2:
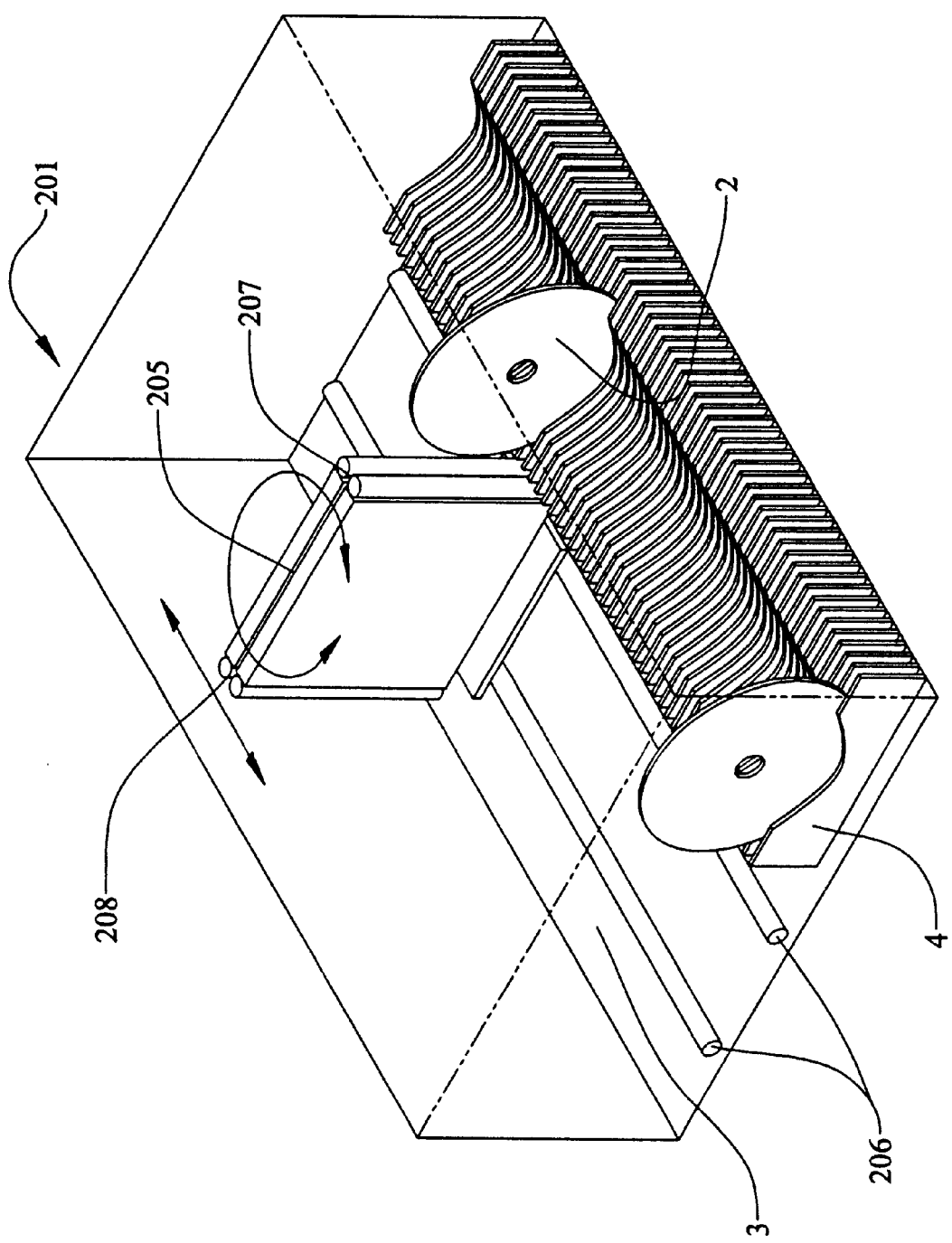
FIG. 2 is a top isometric view of an optical disk changer with an optical disk reader slidably and rotatably coupled to a base.

FIG. 2 shows an optical disk changer 201 for reading a first and a second side of an optical disk 2. In an embodiment of the invention, the disk may be a dual-sided DVD. In FIG. 2, the top and two sides of the disk changer 201 have been removed for clarity. As in the first embodiment, a base 3 supports a disk bin 4. The base and disk bin of the second embodiment are substantially identical to the base and disk bin described in the first embodiment.

Optical Disk Reader

In the embodiment illustrated in FIG. 2, an optical disk reader 205 that is coupled to rails 206 of the base 3 is able to slide back and forth on the rails 206. Additionally, at least a portion of the reader 205 is able to rotate about a vertical axis relative to the base 3.

The reader 205 includes conventional sensors, e.g. an optical sensor 210, and electronics for reading an optical disk. In the embodiment shown in FIG. 2, the reader 205 includes a first loading mechanism 207 that is located on a first side of the reader 205. The first loading mechanism 207 may be formed by two substantially parallel cylinders that cooperatively rotate to move the optical disk. The reader 205 also contains a second loading mechanism 208 on a second side of the reader 205. The second loading mechanism 208 may also be formed by two substantially parallel cylinders that cooperatively rotate to move the optical disk. Loading mechanisms of various configurations are well known in the art and other operable loading mechanisms are within the scope of the claims of the present invention.

The reader 205 may also include an ejector arm 212 (shown schematically in FIG. 2). The ejector arm 212 can be used to push the optical disk 2 from the disk bin 4 in a first direction to the reader 205. Any ejector mechanism that loads the disk 2 from the carrousel 4 into the reader 205 with or without the use of an ejector arm will suffice. Ejector arms for disk loading are well known in the art.

Method of Operating the Second Embodiment of the Invention

Figure 8:
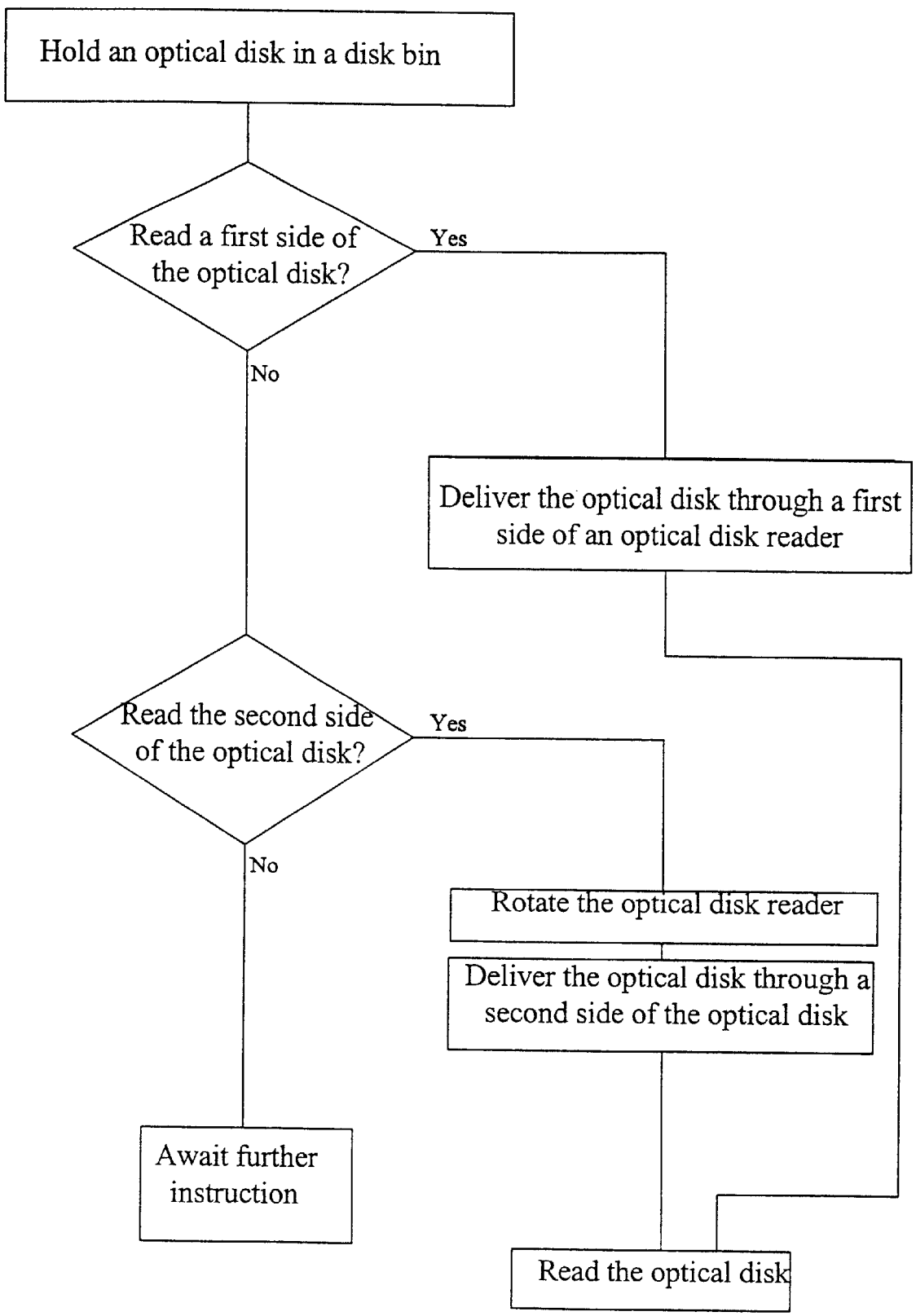
FIG. 8 is a flowchart illustrating a method of reading data from an optical disk associated with a second embodiment of the present invention.

Another embodiment of the invention is a method of reading data from an optical disk. This method, which is shown in FIG. 8, may be performed by the disk changer 201 shown in FIG. 2. If data from the first side of the optical disk that is held in the disk bin is to be read, the optical disk is delivered to the optical reader. This delivery is made by delivering the disk into the reader through a first side of the optical disk reader. At this point, the data from the first side of the disk may be read. After reading, the disk may then be returned to the disk bin.

If data from a second side of the optical disk is to be read, the reader is rotated so that a second side of the reader is adjacent to the disk bin. The disk is then delivered through the second side of the disk reader. The reader has then accepted the disk in a position to read the second side of the disk. After reading the data on the second side of the disk, the disk may be delivered back to the disk bin.

Description of the Third Embodiment

Figure 3:
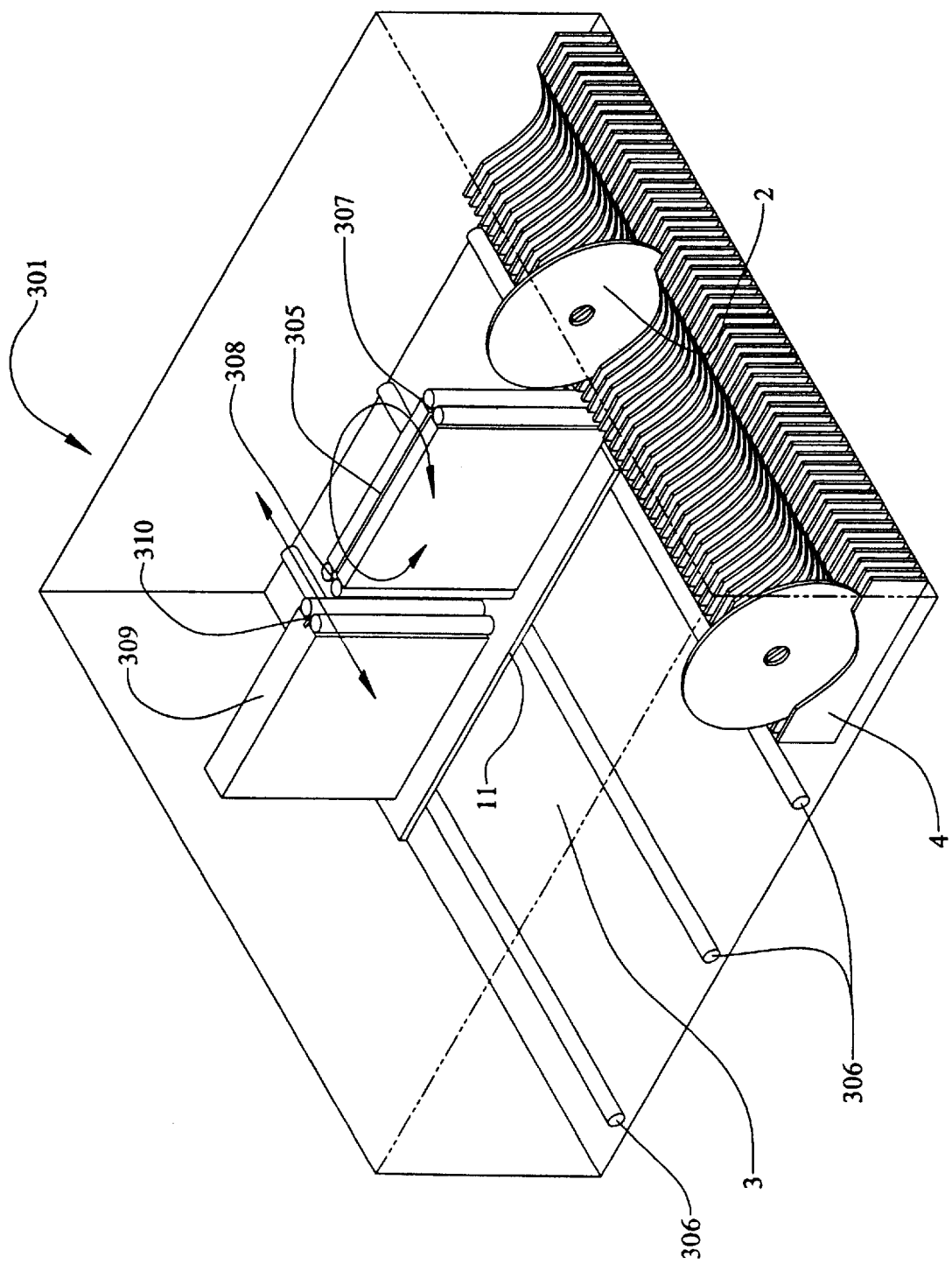
FIG. 3 is a top isometric view of an optical disk changer with a transfer mechanism slidably and rotatably coupled to a base and an optical disk reader slidably coupled to a base.

FIG. 3 shows an optical disk changer 301 for reading a first and a second side of an optical disk 2. In an embodiment of the invention, the disk may be a dual-sided DVD. In FIG. 3, the top and two sides of the disk changer 301 have been removed for clarity. As in the first embodiment, a base 3 supports a disk bin 4. The base and disk bin of the third embodiment are substantially identical to the base and disk bin described in the first embodiment.

Transfer Mechanism

In the embodiment illustrated in FIG. 3, a transfer mechanism 305 is rotatably coupled to a platform 11 that is coupled to rails 306 of the base 3. The platform 11 is slidably coupled to the rails 306. The transfer mechanism is thus able to slide back and forth on the rails 306. Additionally, at least a portion of the transfer mechanism 305 is able to rotate about a vertical axis relative to the base 3.

In the embodiment shown in FIG. 3, the transfer mechanism 305 includes a first loading mechanism 307 that is located on a first side of the transfer mechanism 305. The first loading mechanism 307 may be formed by two substantially parallel cylinders that cooperatively rotate to move the optical disk. The transfer mechanism 305 also contains a second loading mechanism 308 on a second side of the transfer mechanism 305. The second loading mechanism 308 may also be formed by two substantially parallel cylinders that cooperatively rotate to move the optical disk. Loading mechanisms of various configurations are well known in the art and other operable loading mechanisms are within the scope of the claims of the present invention.

The transfer mechanism 305 may also include an ejector arm (not shown). The ejector arm can be used to push the optical disk 2 from the disk bin 4 in a first direction to the transfer mechanism 305. Any ejector mechanism that loads the disk 2 from the carrousel 4 into the transfer mechanism 305 with or without use of an ejector arm will suffice. Ejector arms for disk loading are well known in the art.

Optical Disk Reader

Referring again to FIG. 3, an optical disk reader 309 is shown. As shown in FIG. 3, the optical disk reader 309 is attached to the platform 11 along with the transfer mechanism 305. The reader 309 is therefore able to slide on the rails 306 relative to the base 3. The optical disk reader can load a disk from the transfer mechanism 305, play the disk, and return the disk to the transfer mechanism 305. The optical disk reader 309 includes conventional sensors and electronics for reading an optical disk. In addition, the reader 309 includes a first loading mechanism 310 that is located on a first side of the reader 309. The first loading mechanism 310 may be formed by two substantially parallel cylinders that cooperatively rotate to move the optical disk.

Method of Operating the Third Embodiment of the Invention

Figure 9:
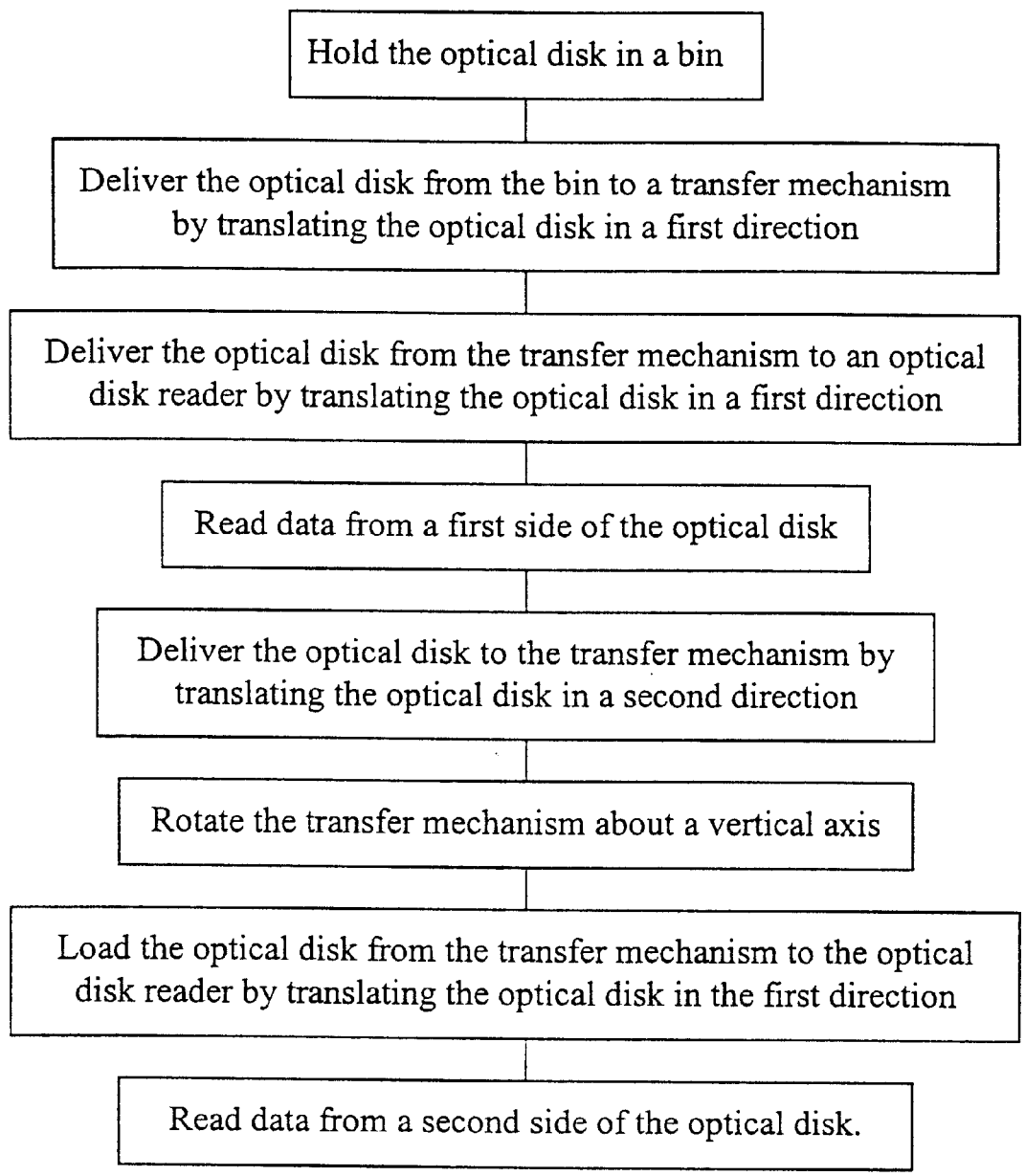
FIG. 9 is a flowchart illustrating a method of reading data from an optical disk associated with a third embodiment of the present invention.

Still another embodiment of the invention is a method of reading data from an optical disk. This method, which is shown in FIG. 9, may be performed by the disk changer 301 shown in FIG. 3. If data from the first side of the optical disk is to be read, the disk is delivered from the disk bin into a transfer mechanism by translating the disk in a first direction. The disk is then delivered to an optical disk reader by translating the disk in a first direction to the optical disk reader.

Next, data from a first side of the disk is read. After data from the first side of the disk is read or upon operator command, the disk is unloaded from the reader and delivered to the transfer mechanism by translating the disk in the second direction. In some embodiments, at least a portion of the transfer mechanism is rotated one hundred eighty degrees about a vertical axis to flip the disk in preparation for a second side of the disk to be read. The disk is then loaded from the transfer mechanism to the optical disk reader by translating the optical disk in the first direction.

Data from the second side of the optical disk may then be read. After data from the second side of the disk is read or upon operator command, the disk is unloaded from the reader and delivered in the second direction to the transfer mechanism. From the transfer mechanism, the disk may be returned to the disk bin.

Another Method of Operating the Third Embodiment of the Invention

Figure 10:
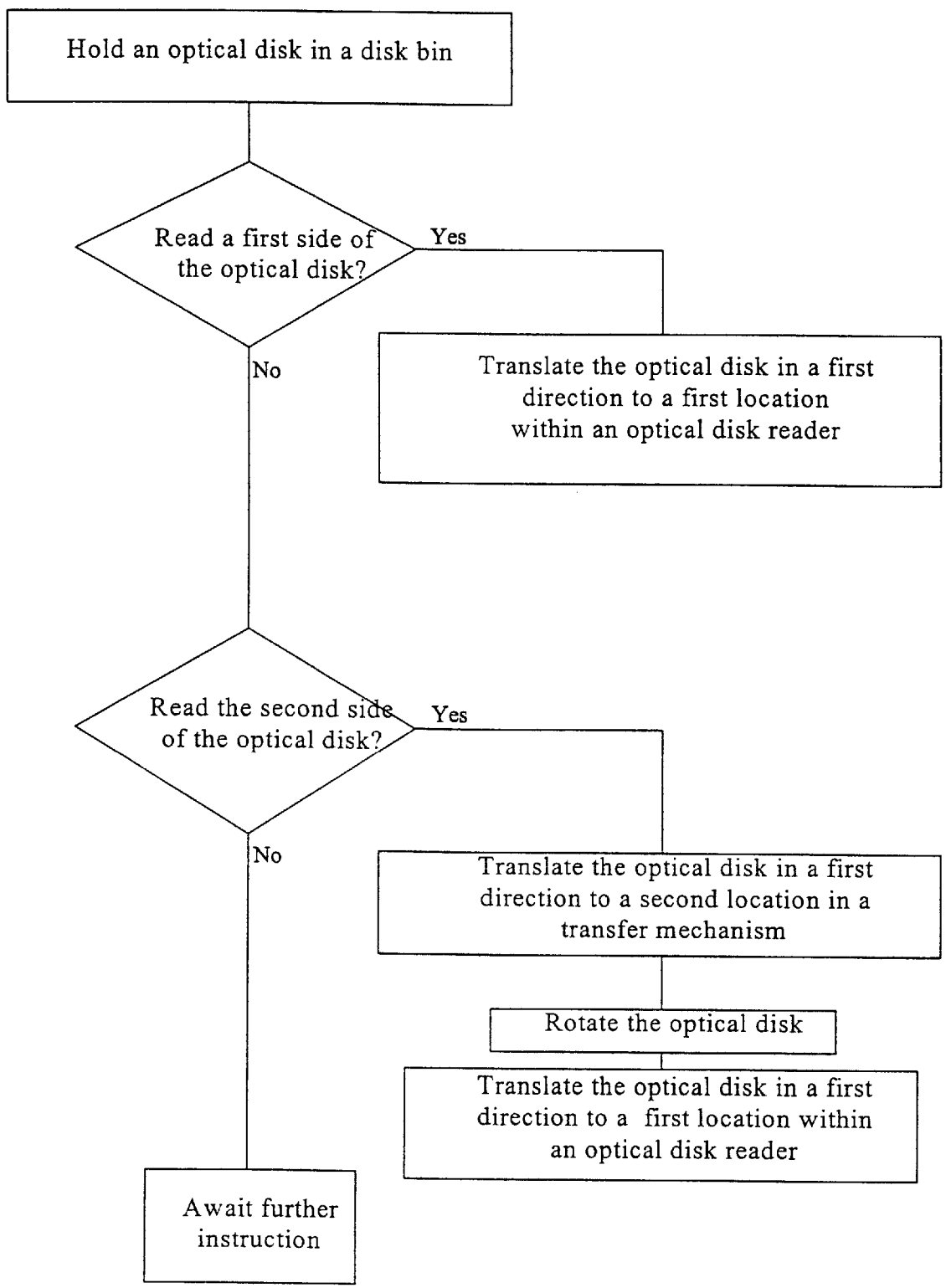
FIG. 10 is a flowchart illustrating a method of translating an optical disk associated with a third embodiment of the present invention.

Another embodiment of the invention is shown in FIG. 10. This method may be performed by the disk changer 301 shown in FIG. 3. In this embodiment, an optical disk is held in a disk bin. If data from the first side of the optical disk is to be read, the optical disk is translated in a first direction to a location within an optical disk reader where the disk can be read. In one embodiment, the disk is first translated to a transfer mechanism and then to the location within the optical disk reader. After reading the data on the first side of the disk, the disk may be returned to the disk bin.

On the other hand, if data from the second side of the optical disk is to be read, then the optical disk is translated in a first direction from the disk bin to a second location in the transfer mechanism and rotated by the transfer mechanism. Subsequently, the optical disk is delivered to the disk reader by translating the optical disk to the reader in a first direction. After reading the data on the second side of the disk, the disk may be delivered back to the transfer mechanism and to the disk bin.

Description of the Fourth Embodiment

Figure 4:
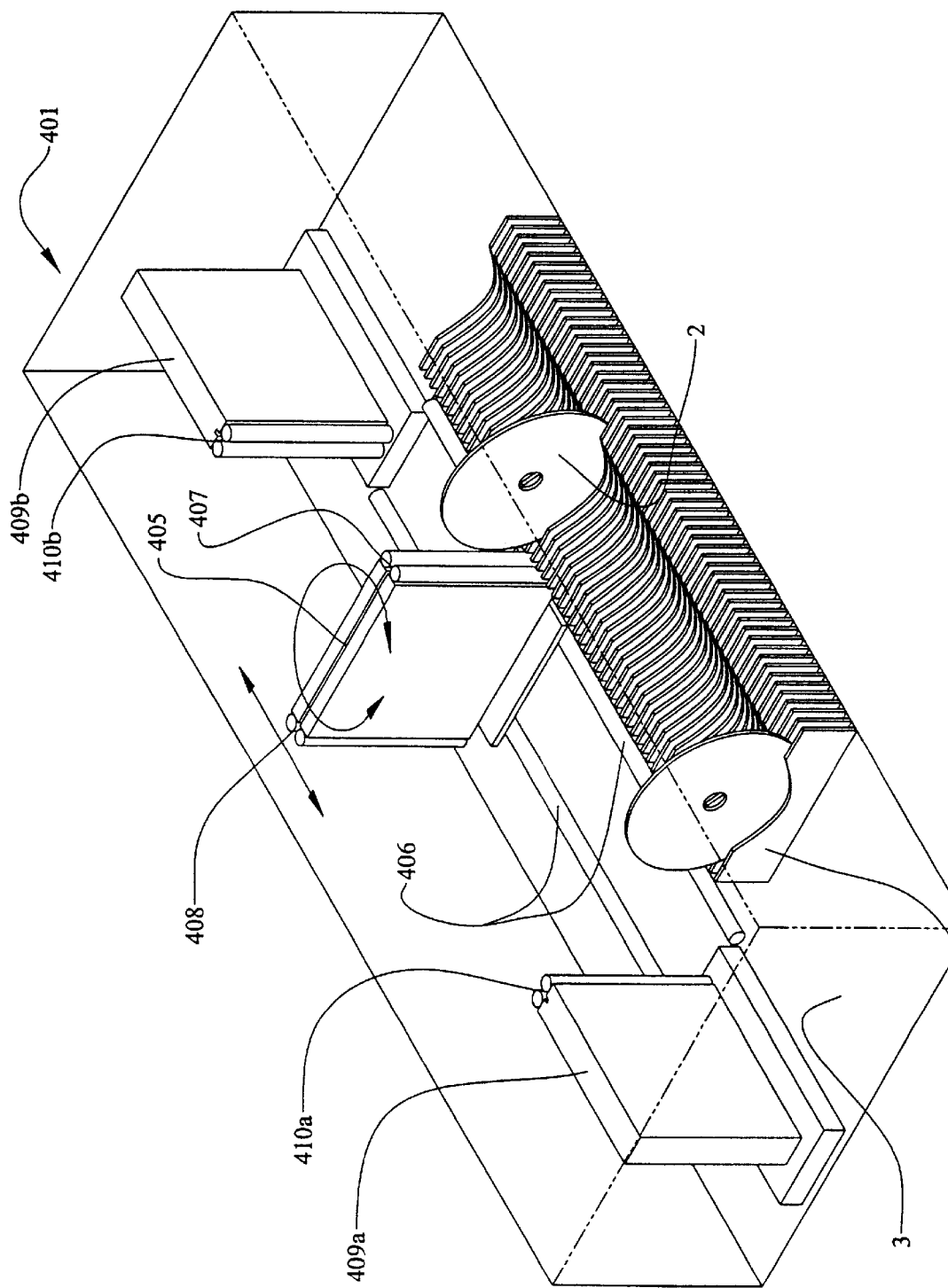
FIG. 4 is a top isometric view of an optical disk changer with a transfer mechanism slidably and rotatably coupled to a base and an optical disk reader attached to the base so that the direction of loading into the reader is perpendicular to the sliding of the transfer mechanism.

FIG. 4 shows an optical disk changer 401 for reading a first and a second side of an optical disk 2. In an embodiment of the invention, the disk may be a dual-sided DVD. In FIG. 4, the top and two sides of the disk changer 401 have been removed for clarity. As in the first embodiment, a base 3 supports a disk bin 4. The base and disk bin of the third embodiment are substantially identical to the base and disk bin described in the first embodiment.

Transfer Mechanism

In the embodiment illustrated in FIG. 4, a transfer mechanism 405 that is coupled to rails 406 of the base 3 is able to slide back and forth on the rails 406. Additionally, at least a portion of the transfer mechanism 405 is able to rotate about a vertical axis relative to the base 3.

In the embodiment shown in FIG. 4, the transfer mechanism 405 is substantially identical in structure with the transfer mechanism 105 described above. The primary difference is that the transfer mechanism 405 is used to load disks into optical disk readers 409a and 409b that are substantially parallel with the sliding direction of the transfer mechanism.

Optical Disk Readers

Referring still to FIG. 4, two optical disk readers 409a and 409b are shown. The function and structure of the optical disk readers 409a and 409b is substantially identical to the function and structure of the optical disk reader 109a The primary difference is that the direction of loading the optical disk reader 109a is oriented perpendicular to the sliding of the transfer mechanism 105, and the direction of loading the optical disk readers 409a and 409b is parallel with the sliding of the transfer mechanism 405.

Method of Operating the Fourth Embodiment of the Invention

Figure 11:
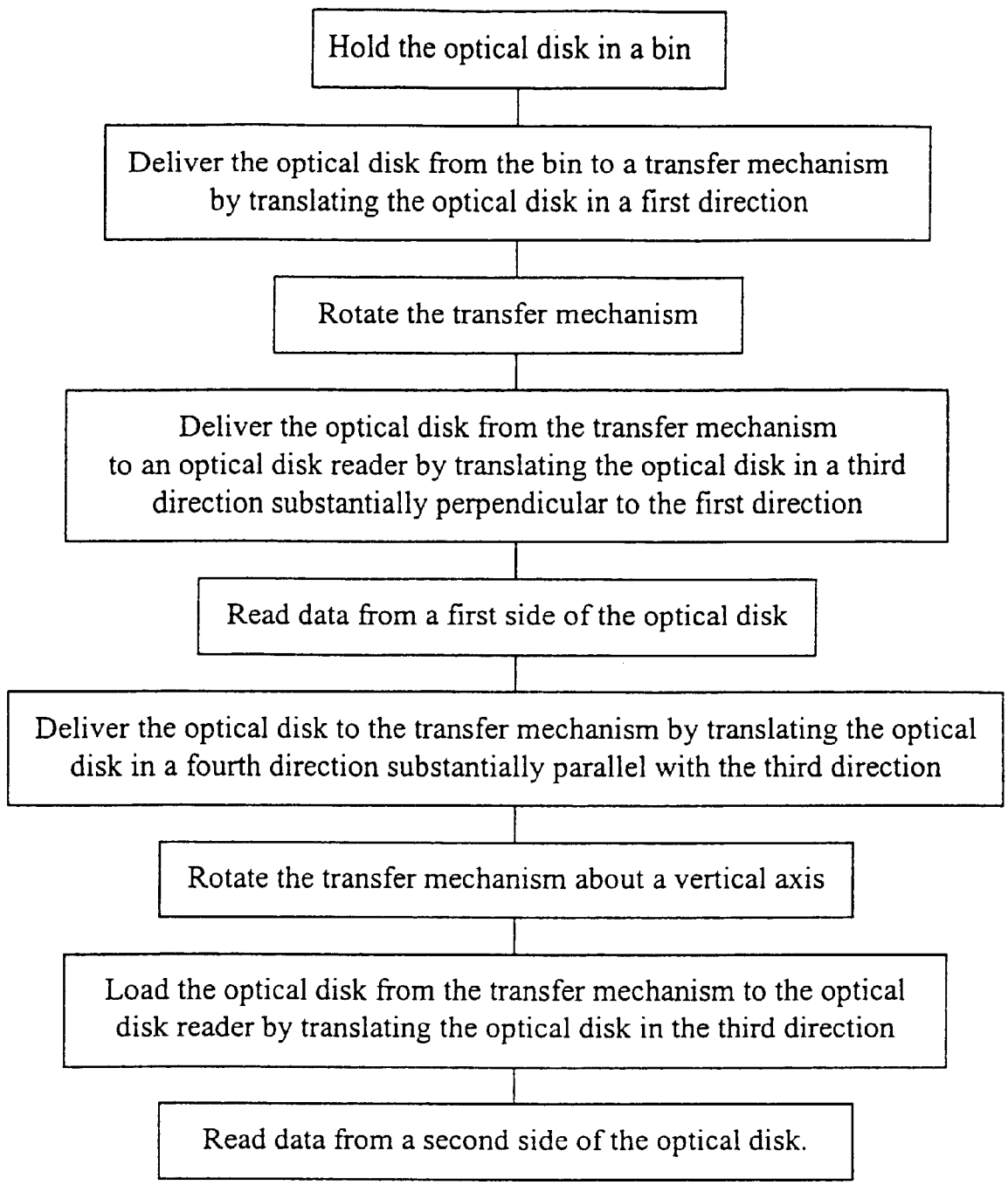
FIG. 11 is a flowchart illustrating a method of reading data from an optical disk associated with a fourth embodiment of the present invention.

Another embodiment of the invention is a method of reading data from an optical disk. This method, which is shown in FIG. 11, may be performed by the disk changer 401 shown in FIG. 4. First, an optical disk that is being held in a disk bin is delivered from the disk bin into a transfer mechanism by translating the disk in a first direction. The disk is then delivered to an optical disk reader by first moving the entire transfer mechanism laterally relative to the disk bin and rotating the transfer mechanism about a vertical axis to align the disk with the optical disk reader. Subsequently the disk is translated in a third direction and into the optical disk reader. The third direction is substantially perpendicular to the first direction.

Next, data from a first side of the disk is read. After data from the first side of the disk is read or upon operator command, the disk is unloaded from the reader and delivered to the transfer mechanism by translating the disk in a fourth direction substantially parallel with the third direction. In some embodiments, at least a portion of the transfer mechanism is rotated one hundred eighty degrees about a vertical axis to flip the disk in preparation for a second side of the disk to be read. In embodiments where a second side is to be read, the disk is loaded from the transfer mechanism to the optical disk reader by translating the optical disk in the third direction.

Then, data from the second side of the optical disk may be read. After data from the second side of the disk is read or upon operator command, the disk is unloaded from the reader and delivered in the fourth direction to the transfer mechanism. From the transfer mechanism, the disk may be returned to the disk bin.

Another Method of Operating the Fourth Embodiment of the Invention

Figure 12:
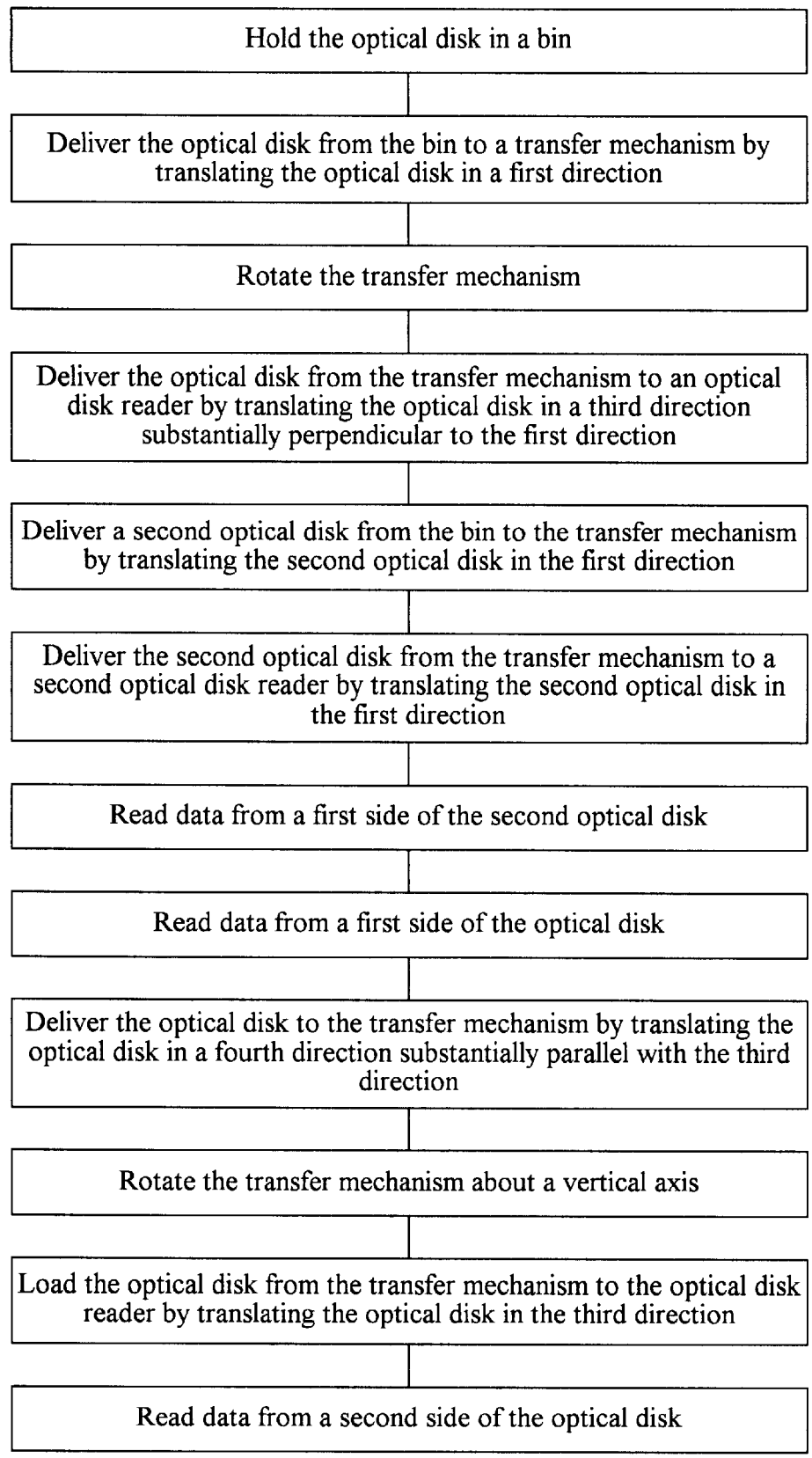
FIG. 12 is a flowchart illustrating a method of reading data from an optical disk associated with a fourth embodiment of the present invention.
Figure 2:
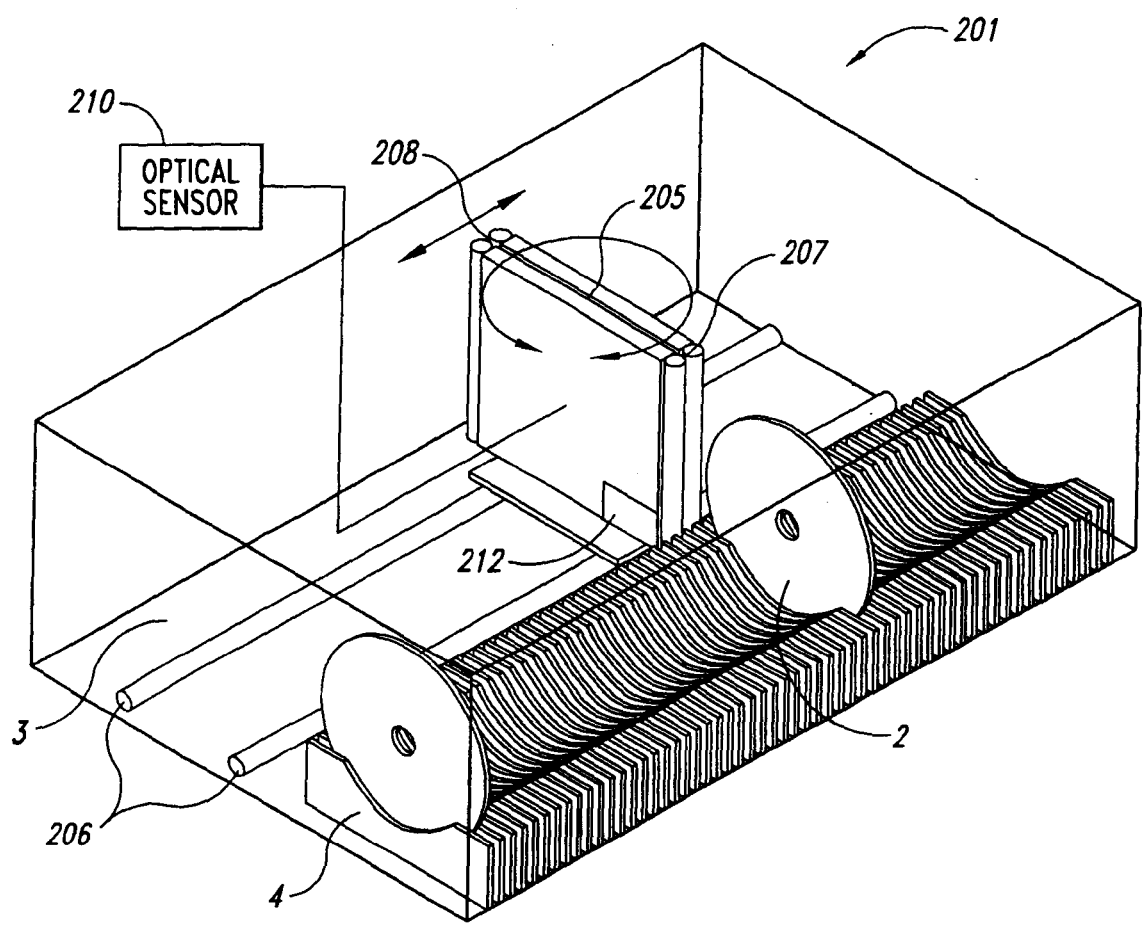
Figure 4:
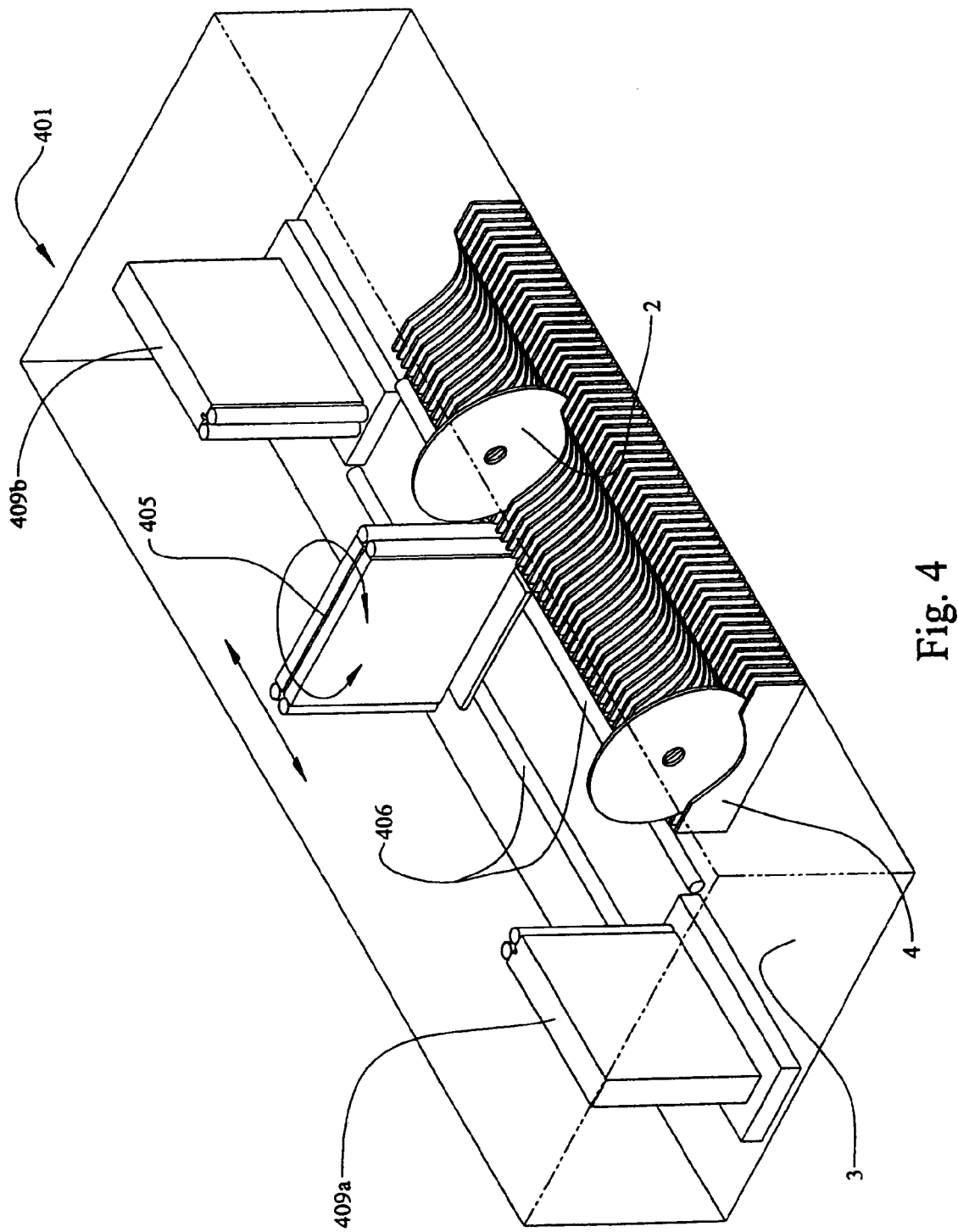

In another method of operating the fourth embodiment, a second optical disk reader is required. The method, which is illustrated in FIG. 12, may be performed by the disk changer 401 shown in FIG. 4. The method provides for simultaneous or rapid sequential reading of multiple optical disks. After the act of delivering the first optical disk from the transfer mechanism described in the embodiment immediately above, a second optical disk is delivered from the bin to the transfer mechanism by translating the second optical disk in the first direction. The second optical disk may then be delivered from the transfer mechanism to a second optical disk reader by translating the second optical disk in the fourth direction. Data from a first side of the second optical disk may then be read.

It is evident from a description of this method that two or more disks can be handled by the disk changer described to enable a large data retrieval capacity from a single changer. With such a machine and method, the number of readers required per disk made accessible can be reduced.

From the foregoing it will be appreciated that, although specific embodiments of the invention have been described herein for purposes of illustration, various modification may be made without deviating from the spirit and scope of the invention. Accordingly, the invention is not limited except as by the claims.

Advantages of the Invention

An advantage of some embodiments of the present invention is that they provide for fully automatic reading of dual-sided optical disks. As an increasing number of optical disks contain data on both sides of the disk, the need for automatic reading of both sides of a disk will be accentuated. For instance, a dual-sided DVD that is not automatically changed would require operator intervention at the end of the playing of the first side before the balance of the video could be viewed.

Another advantage of the invention is that with an identical storage volume the invention enables access by any automated device to twice as much digital information. To be truly automated, an automated optical disk device must necessarily be able to access all of the data stored on the disks within the automated system. With prior technology, dual-sided disks could not be accessed without operator intervention. Thus, for automatic operation, single-sided disks would be required. Therefore, with the present invention, half as much storage volume is required to effectively operate an automated optical disk device.

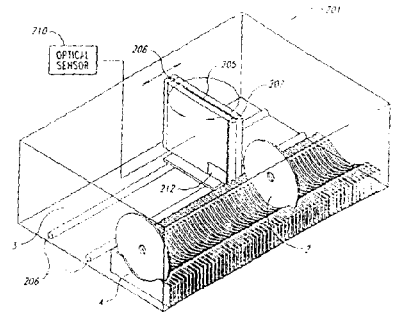

What is claimed is:

1. An optical disk changer for reading a first and a second side of an optical disk comprising:
   (a) a base;
   (b) a horizontally oriented disk bin coupled to said base for holding the optical disk; and
   (c) an optical disk reader slidably and rotatably coupled to said base for rotating the optical disk about a vertical axis and reading the disk;
   (d) a first loading mechanism on a first side of the optical disk reader adapted to load a disk from said disk bin; and
   (e) a second loading mechanism on a second side of the optical disk reader adapted to return the disk to said disk bin.

2. The optical disk changer of claim 1 wherein the optical disk is a dual-sided DVD.

3. The optical disk changer of claim 1 wherein said disk bin holds a first disk and a second optical disk, the first disk being substantially linearly coaxial with the center rotational axis of the second optical disk.

4. The optical disk changer of claim 1 wherein said disk bin has slots for holding a plurality of disks.

5. The optical disk changer of claim 1 wherein the first loading mechanism includes two substantially parallel cylinders that cooperatively rotate to move the optical disk and the second loading mechanism includes two substantially parallel cylinders that cooperatively rotate to move the optical disk.

6. The optical disk changer of claim 1 wherein said optical disk reader includes an ejector arm for pushing the optical disk toward the disk reader from said disk bin along a first direction.

7. A method of reading data from an optical disk comprising:
   (a) holding the optical disk in a disk bin;
   (b) when data from a first side of the optical disk is to be read, delivering the optical disk through a first side of an optical disk reader, and reading the data; and
   (c) when data from a second side of the optical disk is to be read, rotating the optical disk reader, delivering the optical disk through a second side of the optical disk reader, and reading the data.

8. An optical disk changer for reading a first and a second side of an optical disk comprising:
   (a) a base;
   (b) a disk bin coupled to said base for holding the optical disk; and
   (c) an optical disk reader, coupled to the base and including an optical sensor positioned to read data from an optical disk positioned in the optical disk reader, the optical disk reader being rotatable about a vertical axis and slidable along a horizontal path with respect to the disk bin.

9. The optical disk changer of claim 8 wherein the optical disk is a dual-sided DVD.

10. The optical disk changer of claim 8 wherein the optical disk is a first optical disk and said disk bin holds the first optical disk and a second optical disk, the first optical disk being substantially linearly coaxial with the center rotational axis of the second optical disk.

11. The optical disk changer of claim 8 wherein said disk bin has a me plurality of slots, each of which is adapted to hold the optical disk.

12. The optical disk changer of claim 8 wherein said optical disk reader is configured to load a disk from the disk bin.

13. The optical disk changer of claim 8 wherein said optical disk reader has a first loading mechanism on a first side of the optical disk reader and a second loading mechanism on a second side of said optical disk reader.

14. The optical disk changer of claim 12 wherein the first loading mechanism includes two substantially parallel cylinders that cooperatively rotate to move the optical disk into and out of said optical disk reader and the second loading mechanism includes two substantially parallel cylinders that cooperatively rotate to move the optical disk into and out of said optical disk reader.

15. The optical disk changer of claim 8 wherein said optical disk reader includes an ejector arm for pushing the optical disk toward the disk reader from said disk bin along a first direction.

16. An optical disk changer for reading a first and a second side of an optical disk comprising:
   (a) a base;
   (b) a disk bin carried by the base and extending in a first direction; and
   (c) an optical disk reader carried by the base and having a first side and a second side, the optical disk reader being rotatable about an axis perpendicular to the first direction to selectively position the first side or the second side of the optical disk reader in proximity to the disk bin for loading a disk from said disk bin.

* * * * *

UNITED STATES PATENT AND TRADEMARK OFFICE
CERTIFICATE OF CORRECTION

PATENT NO. : 6,587,405 B1
DATED : July 1, 2003
INVENTOR(S) : Dean A. Klein

It is certified that error appears in the above-identified patent and that said Letters Patent is hereby corrected as shown below:

The title page should be deleted and substitute therefore the title page as shown on the attached page.

<u>Drawings,</u>
The drawing sheet containing Figs. 2 and 4 should be replaced with the substitute sheets as shown on the attached pages.

Signed and Sealed this

Twenty-fourth Day of August, 2004

JON W. DUDAS
*Director of the United States Patent and Trademark Office*

(12) United States Patent
Klein

(10) Patent No.: US 6,587,405 B1
(45) Date of Patent: Jul. 1, 2003

(54) LINEAR OPTICAL DISK CHANGER WITH SIDE SWITCHING CAPABILITIES

(75) Inventor: Dean A. Klein, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/199,768

(22) Filed: Nov. 25, 1998

(51) Int. Cl.$^7$ .................................................. G11B 17/28
(52) U.S. Cl. ........................... 369/30.59; 369/30.61; 369/30.85; 369/30.89
(58) Field of Search ........................... 369/195, 199, 369/200, 30.47, 30.49, 30.59, 30.55, 30.61, 30.74, 30.7, 30.85, 30.87, 30.89, 30.31; 360/92; 414/277, 807

(56) References Cited

U.S. PATENT DOCUMENTS

| | | | |
|---|---|---|---|
| 1,799,148 A | 4/1931 | Bryant | |
| 1,955,939 A * | 4/1934 | Bishop | 369/192 |
| 2,937,026 A | 5/1960 | Acker | |
| 3,100,644 A | 8/1963 | Osborne et al. | 369/37 |
| 3,165,321 A | 1/1965 | Osborne et al. | |
| 4,416,003 A * | 11/1983 | Suzuki | 369/199 |
| 4,504,934 A | 3/1985 | Tanaka et al. | |
| 4,519,055 A | 5/1985 | Gilson | 369/37 |
| 4,580,254 A * | 4/1986 | Hojyo et al. | 369/30.29 |
| 4,800,999 A | 1/1989 | Matsuo | 198/370 |
| 4,807,208 A | 2/1989 | Geiger | 369/39 |
| 4,855,980 A * | 8/1989 | Hug et al. | 369/36 |
| 4,910,619 A * | 3/1990 | Suzuki et al. | 360/92 |
| 4,972,778 A * | 11/1990 | Suominen | 104/183 |
| 5,027,335 A * | 6/1991 | Deis | 369/30.77 |
| 5,067,116 A | 11/1991 | Kadrmas | 369/37 |
| 5,081,618 A * | 1/1992 | Abe | 369/195 |
| 5,099,465 A | 3/1992 | Geiger et al. | 369/36 |
| 5,128,912 A * | 7/1992 | Hug et al. | 369/38 |
| 5,153,862 A | 10/1992 | Taylor et al. | 369/36 |
| 5,157,648 A * | 10/1992 | Okamoto et al. | 369/195 |
| 5,214,628 A | 5/1993 | Langman et al. | 375/122 |
| 5,235,575 A | 8/1993 | Han | |
| 5,235,579 A | 8/1993 | Ross | 369/37 |
| 5,257,111 A | 10/1993 | Kakuyama | 358/342 |
| 5,293,284 A * | 3/1994 | Sato et al. | 360/92 |
| 5,311,497 A * | 5/1994 | Takizawa et al. | 369/195 |
| 5,448,373 A | 9/1995 | Kim | 358/342 |
| 5,502,697 A * | 3/1996 | Taki | 369/34 |
| 5,502,703 A | 3/1996 | Yamada et al. | |
| 5,506,830 A * | 4/1996 | Ohishi et al. | 369/195 |
| 5,528,566 A | 6/1996 | McGee et al. | |
| 5,559,776 A | 9/1996 | Ikenaga | |
| 5,561,657 A | 10/1996 | Ogawa | 369/179 |
| 5,586,094 A * | 12/1996 | Pines et al. | 369/30.85 |
| 5,610,882 A * | 3/1997 | Dang | 360/92 |
| 5,613,745 A | 3/1997 | Cho et al. | 312/9.9 |
| 5,615,184 A | 3/1997 | Tsuruta et al. | 369/37 |
| 5,631,785 A * | 5/1997 | Dang et al. | 360/92 |
| 5,671,196 A | 9/1997 | Yoshida et al. | 369/34 |
| 5,682,364 A | 10/1997 | Ogawa | 369/36 |
| 5,689,490 A | 11/1997 | Pollard | |
| 5,692,878 A | 12/1997 | Freund | 414/796.6 |
| 5,699,281 A * | 12/1997 | Crucius et al. | 364/561 |
| 5,719,725 A | 2/1998 | Nakao | 360/98.06 |
| 5,742,570 A * | 4/1998 | Taki et al. | 369/36 |
| 5,754,502 A | 5/1998 | Kamemura | 369/37 |
| 5,761,160 A | 6/1998 | Sanada | |
| 5,841,744 A | 11/1998 | Menke et al. | |
| 5,923,638 A * | 7/1999 | Watanabe | 369/192 |
| 5,959,958 A | 9/1999 | Inatani et al. | |
| 5,982,719 A * | 11/1999 | Nishijima et al. | 369/34 |
| 5,995,320 A * | 11/1999 | Ostwald | 360/92 |
| 6,064,544 A * | 5/2000 | Wada | 360/92 |
| 6,212,139 B1 * | 4/2001 | Nakamura et al. | 369/30.85 |
| 6,504,798 B1 * | 1/2003 | Revis | 369/30.23 |

FOREIGN PATENT DOCUMENTS

| | | | |
|---|---|---|---|
| JP | 57-139403 | * | 2/1984 |
| JP | 59-030263 | | 2/1984 |
| JP | 1-237952 | | 9/1989 |
| JP | 4-22441 | * | 1/1992 |

OTHER PUBLICATIONS

U.S. patent application 09/200,320 to Klein, Dean filed on Nov. 25, 1998.*

"General DVD"; p.4 Oct. 1, 1998.

* cited by examiner

*Primary Examiner*—Brian E. Miller
(74) *Attorney, Agent, or Firm*—Perkins Coie LLP

(57) ABSTRACT

An optical disk changer that is capable of automatically playing both sides of a dual-sided optical disk. By coordinated rotation and delivery of disks taken from a linear disk storage bin, both sides of a dual-sided optical disk can be automatically accessed.

16 Claims, 12 Drawing Sheets